(No Model.) 6 Sheets—Sheet 1.

B. F. MERRILL.
SELF LEVELING BERTH.

No. 356,658. Patented Jan. 25, 1887.

(No Model.) 6 Sheets—Sheet 2.

B. F. MERRILL.
SELF LEVELING BERTH.

No. 356,658. Patented Jan. 25, 1887.

Fig. 2

Witnesses:
Jas. E. Hutchinson.
Henry C. Hazard.

Inventor.
Benjamin F. Merrill
by Prindle and Russell
Attorneys (No Model.) 6 Sheets—Sheet 3.

B. F. MERRILL.
SELF LEVELING BERTH.

No. 356,658. Patented Jan. 25, 1887.

Witnesses:
Jas. E. Hutchinson.
Henry C. Hazard.

Inventor.
Benjamin F. Merrill
by Prindle & Russell
Attorneys (No Model.)  6 Sheets—Sheet 4.
B. F. MERRILL.
SELF LEVELING BERTH.
No. 356,658.  Patented Jan. 25, 1887.
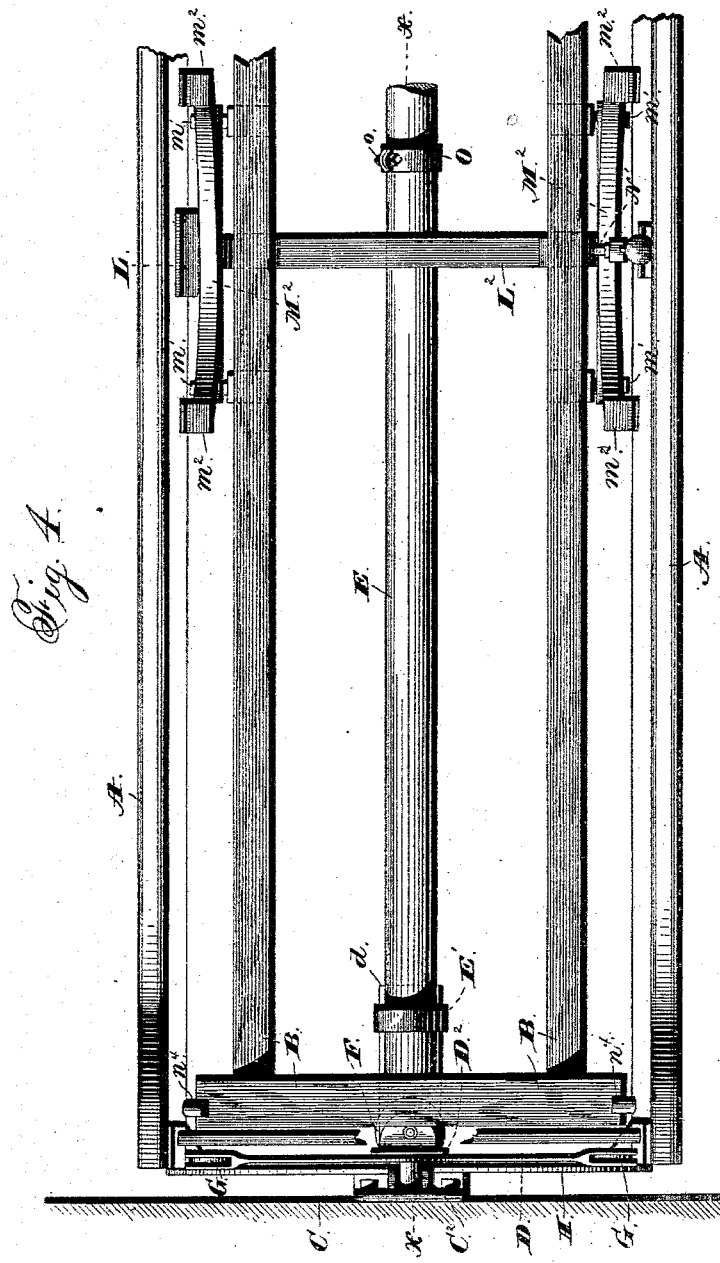

(No Model.) 6 Sheets—Sheet 5.
B. F. MERRILL.
SELF LEVELING BERTH.
No. 356,658. Patented Jan. 25, 1887.
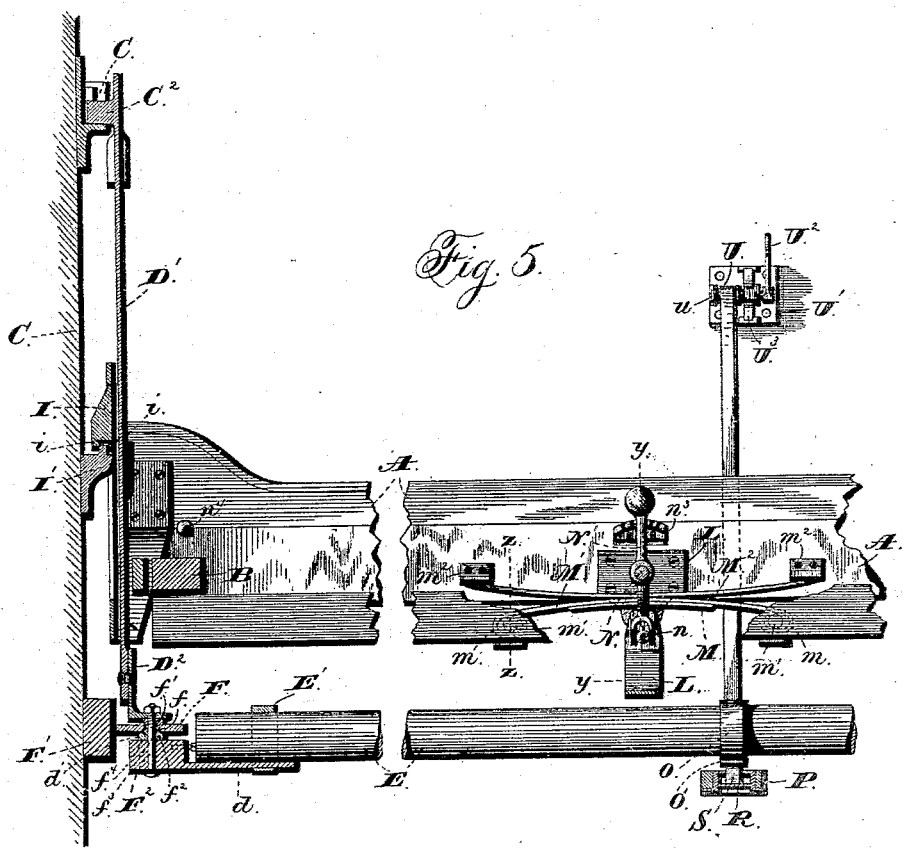
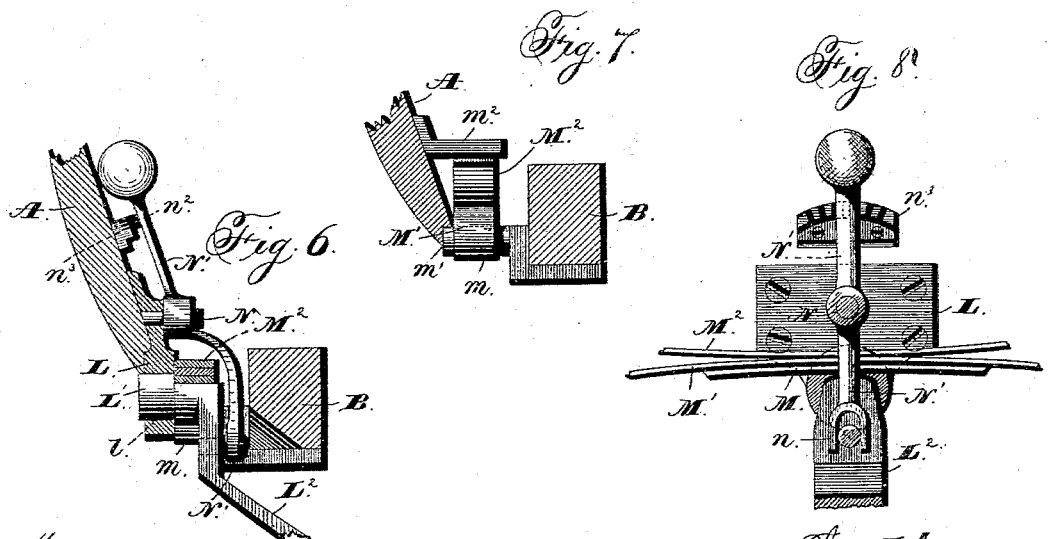
Witnesses:
Jas. E. Hutchinson
Henry C. Hazard
Inventor.
Benjamin F. Merrill
by Prindle and Russell
Attorneys (No Model.) 6 Sheets—Sheet 6.

B. F. MERRILL.
SELF LEVELING BERTH.

No. 356,658. Patented Jan. 25, 1887.

Witnesses:
Jas. E. Hutchinson
Henry C. Hazard

Inventor:
Benjamin F. Merrill
by Prindle and Russell
Attorneys

UNITED STATES PATENT OFFICE.

BENJAMIN F. MERRILL, OF BOSTON, MASSACHUSETTS, ASSIGNOR, BY MESNE ASSIGNMENTS, TO THE MERRILL MARINE BERTH COMPANY.

SELF-LEVELING BERTH.

SPECIFICATION forming part of Letters Patent No. 356,658, dated January 25, 1887.

Application filed March 18, 1886. Serial No. 195,702. (No model.)

*To all whom it may concern:*

Be it known that I, BENJAMIN F. MERRILL, of Boston, in the county of Suffolk, and in the State of Massachusetts, have invented certain new and useful Improvements in Self-Leveling Berths; and I do hereby declare that the following is a full, clear, and exact description thereof, reference being had to the accompanying drawings, in which—

Figure 1:
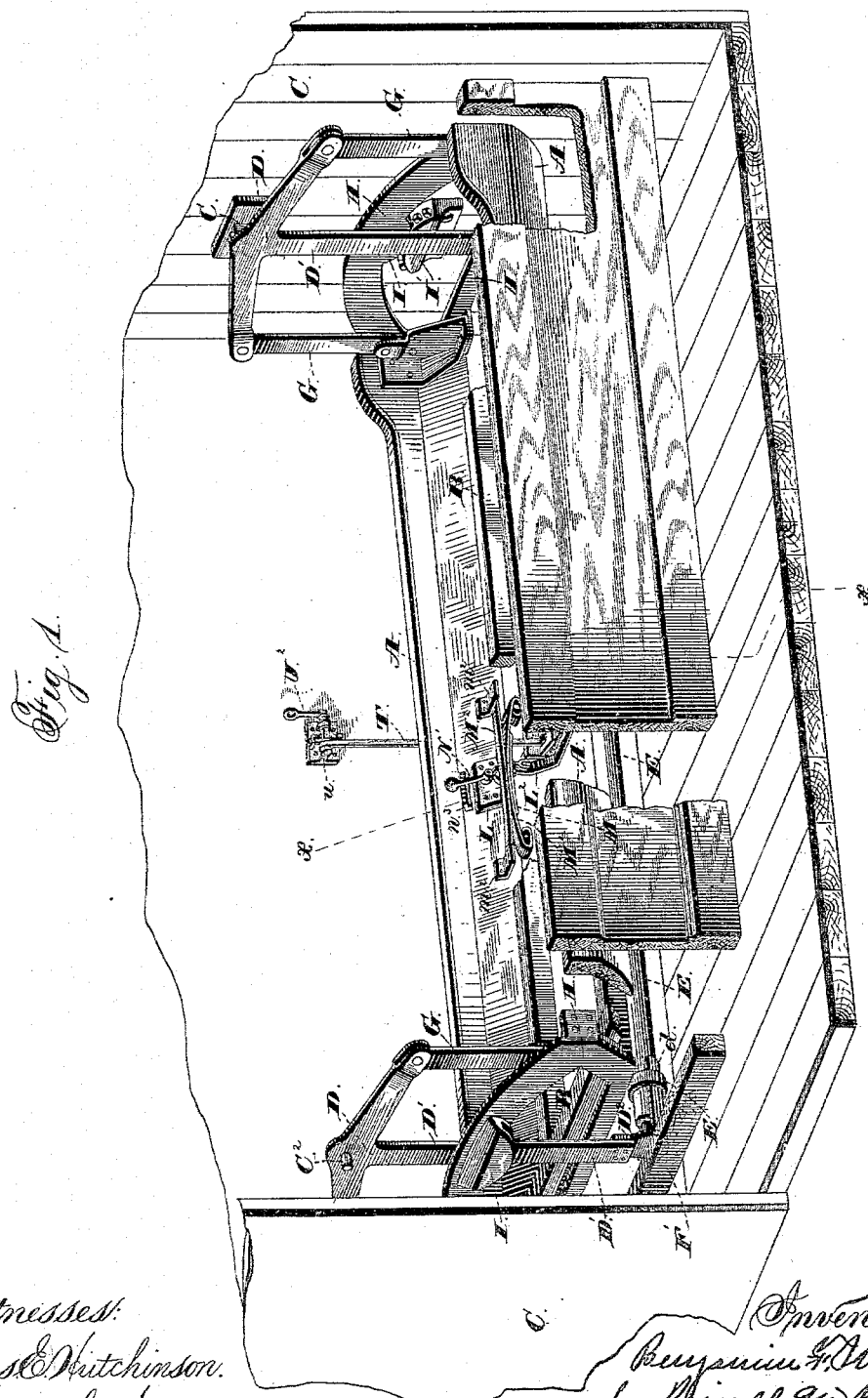
Figure 5:
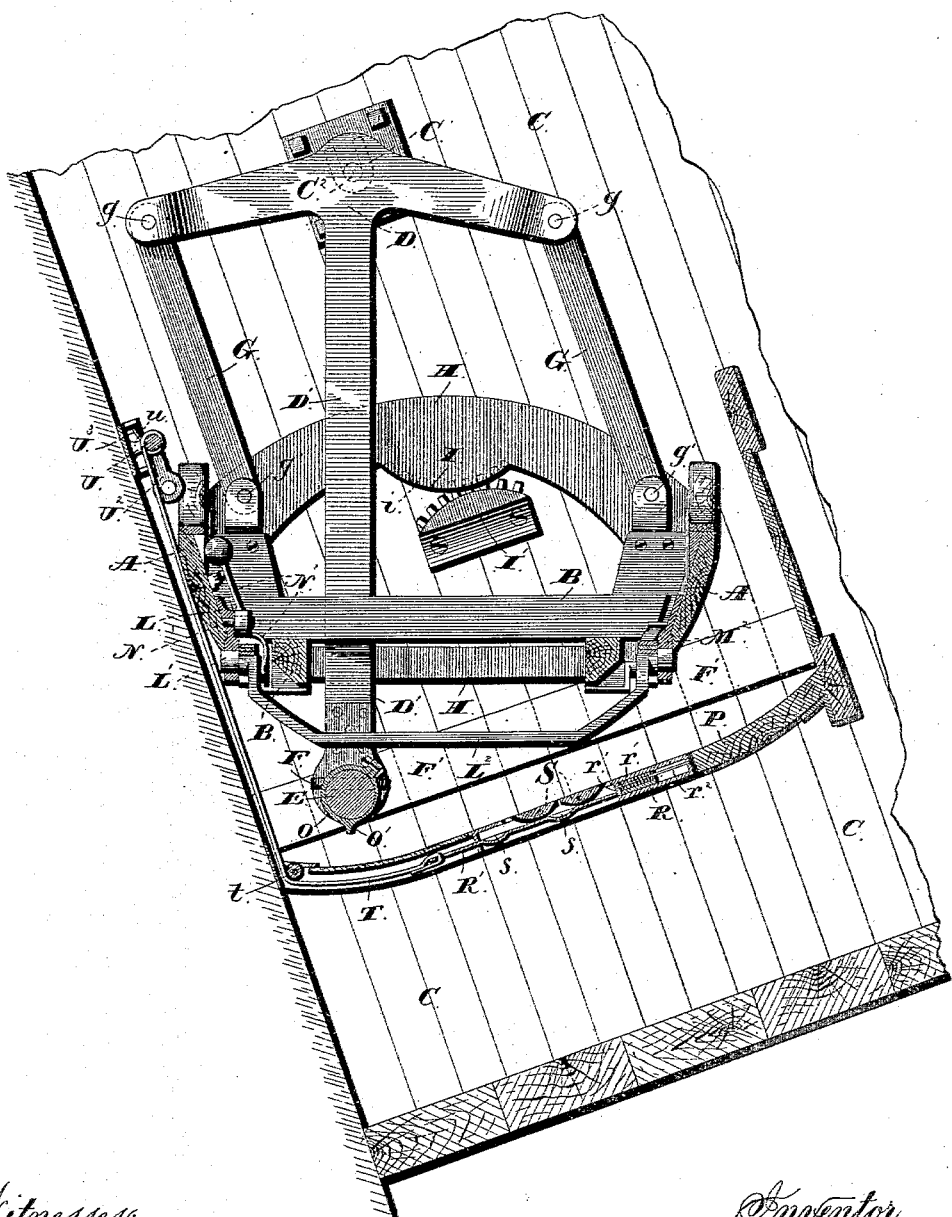
Figure 9:
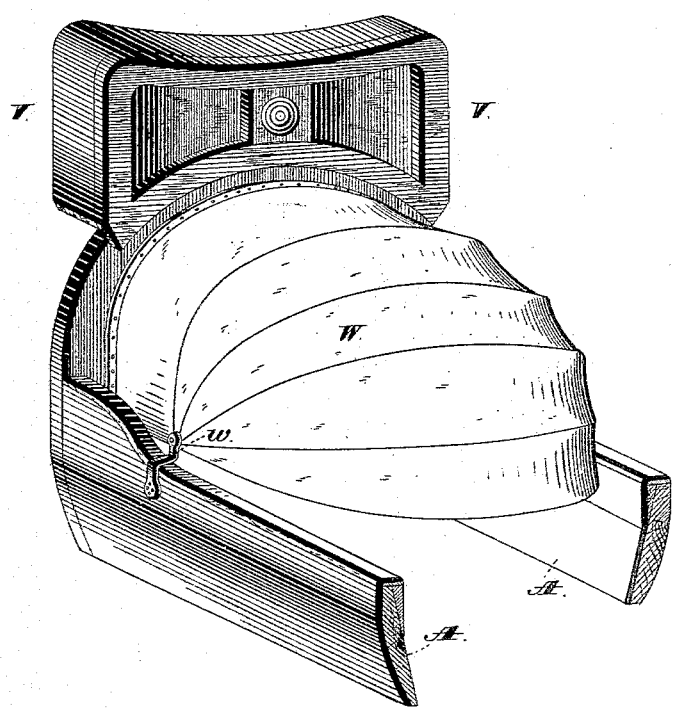
Figure 10:
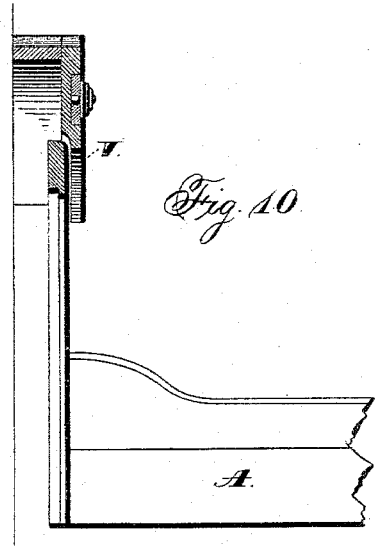

Figure 1 shows a perspective view of a berth embodying my invention, a portion of the front being broken away to disclose details of construction at one end; Fig. 2, a vertical transverse section on line $x\ x$ of Fig. 1, with the parts in position as when the vessel is upright; Fig. 3, a similar view with the berth and suspension devices in position as when the vessel rolls to one side; Fig. 4, a plan view of a portion of the berth and the supporting and leveling devices at one end of the berth; Fig. 5, a longitudinal vertical section on line $x\ x$ of Fig. 4, portions of the bed-bottom frame being broken away to show the adjustable supporting device for the bed-bottom; Fig. 6, a view of a vertical section on line $y\ y$ of Fig. 5; Fig. 7, a view of a similar section on line $z\ z$ of Fig. 5; Fig. 8, an enlarged detail view, in elevation, of the supporting and balancing mechanism for the bed-bottom; Fig. 9, a detail perspective view of the head end of the berth, showing the hood attached to the end board of the bed, and Fig. 10 a vertical central sectional view of the bed end board and the shield for concealing the upper portion of the suspending and leveling devices.

Letters of like name and kind refer to like parts in each of the figures.

The object of my invention is to provide an improved self-leveling berth; and to this end my invention consists in the construction, arrangement, and combination of parts, as hereinafter specified, and more particularly pointed out in the claims.

In the drawings, A designates the framework of the berth proper. Within this frame is the movable bed-bottom B, supported as will be hereinafter set forth.

To the bulk-head C, at each end of the berth, is fastened a U-shaped journal-bearing, C', receiving and supporting the journal-stud C² on the pendulous yoke D, formed with a long pendulum-bar, D'. To the lower end of this pendulum-bar is fastened the angle-piece D², having its lower portion projecting inward under the bed-bottom at a right angle to the pendulum-bar. This inwardly-projecting portion of each of the angle-pieces D² D² is formed with an extension or arm, $d$, concave on its upper side, so as to form a supporting-socket for one end of the weight-bar E, extending longitudinally under the bed-bottom. To hold the ends of this bar closely and firmly down in their respective sockets, a ring, E', is passed over each end of the bar and the arm $d$, forming the support therefor, as shown in Fig. 5.

The weight-bar fastened, as described and shown, to the angle-pieces on the lower ends of the pendulum-bars connects such bars rigidly, and, acting as the weight for both, compels them to swing or move synchronously.

To best support the lower end of each pendulum-bar and the angle-piece thereon at a proper distance from the bulk-head, I provide within a horizontal mortise or recess, $d'$, within the angle-piece, a roller or wheel, F, projecting beyond the outer side of the angle-piece a sufficient distance to engage and roll upon a piece or strip, F', attached to the bulk-head. This wheel is preferably formed, as shown, with a central recess or rabbet, $f$, on its lower side and a corresponding offset or projection, $f'$, on its upper side. A block, $f^2$, resting on the lower side of the mortise or recess $d'$, has on its upper side the reduced portion $f^3$, entering the central rabbet or recess, $f$ in the wheel. Down through the angle-piece, the wheel, and the journal-block $f^2$ passes the bolt F². The upper side of the wheel mortise or recess in the angle-piece is preferably formed with the shoulder $f^4$, engaging the outer side of the hub or offset on the upper side of the wheel. This, however, is not necessary, as the bolt holds most firmly and strongly in place both the wheel and the journal-block $f^2$ below, upon which the wheel is journaled and supported clear of the bottom of the mortise $d'$.

As the pendulums swing, the wheels will run upon their respective strips on the bulk-heads, and so keep the pendulums always parallel with the bulk-heads, and will prevent any longitudinal swing of the weight-bar, which the pitching of the vessel would otherwise cause.

The arms of the pendulous yoke do not extend out at right angles to the pendulum-bar, but preferably extend slightly downward, so that the effect is the same as if an arch yoke were used.

To the outer ends of the yoke-arms, below the level of the pivot stud or bearing $C^2$ of the yoke, are pivotally attached, by means of suitable pivot-bolts, $g\ g$, the upper ends of links G G.

The berth A is supported from the lower ends of the four links by suitable pivot-bolts, $g'$.

The berth and the leveling mechanism therefor are supported by the pivot studs or bearings $C^2\ C^2$, resting in the journal-bearings $C'\ C'$.

At each end of the berth an arched plate, H, preferably of metal, extends from one side of the berth-frame to the other, just back of or beyond the pendulum at that end of the berth. This plate upon the under side of the central part of its arch is provided with the downwardly-curved rack I, which meshes with the coacting rack I', preferably curved upward, so that the two racks will always remain in gear during the rolling of the vessel and the consequent changing of the relative positions of the bulk-head and berth.

The berth is so supported from the journal-studs $C^2\ C^2$ and the bearings $C'\ C'$ through the yokes and links G G, as described, that, while the teeth of the racks intermesh, the teeth of rack I do not bottom into rack I'. The rack I is, as shown in the drawings, provided with ribs or flanges $i\ i$, situated on opposite sides of the teeth on rack I', which serve to keep the rack I always in place with reference to rack I'. These racks can be both oppositely curved, as shown and described hereinbefore, or one of them can be straight and the other curved, as desired; but they must be of such form and the teeth so arranged that contact between the two racks will be maintained whatever the degree of inclination of the bulkhead with reference to the berth may be.

The leveling and suspending devices already described are preferably made of metal, so as to take up as little space as possible and yet be strong.

Each board or plate H is at such distance from the head or foot board of the berth as to allow the pendulum to swing between them.

It will be observed that, as indicated above, with my arrangement of suspending and leveling devices the whole weight of the berth and leveling mechanism is supported independently of and not upon the racks.

As shown in Fig. 3, when the vessel rolls to port the racks I' I' are carried to the starboard side of a vertical plane through the pivotal studs or bearings $C^2\ C^2$, and through the action of the intermeshing racks on the berth and bulk-heads the berth is also carried to that side of the same plane. Without these intermeshing racks the berth would obviously tend to hang with its center of gravity directly below the line connecting its points of support. If it were allowed to hang so freely, much space would have to be left on each side of the berth to allow of its necessary lateral movement with relation to the bulk-heads as its pivotal supports above traveled back and forth from side to side with the rolling of the vessel.

With my arrangement of supporting and leveling devices the minimum of space between the sides of the berth proper and the casing therefor is required, for evidently the berth can have no lateral movement independent of the bulk-heads.

As the vessel rolls the sides of the berth-casing must move with the bulk-heads; but the berth remains level, and retains its central position between the casing sides without possibility of coming into contact with them.

To allow for considerable rocking of the berth-casing with reference to the berth, where the latter is made quite deep the sides of the berth may be, as shown in the drawings, made inclined inward and downward from the upper and outer edges thereof.

The axes of motion of the berth-casing sides with reference to the berth is a line connecting the middle points of the racks I I at the opposite ends of the berth. As these points are midway between the sides of the berth, the reason why the casing sides do not approach or recede from the upper portion of the berth sides as the vessel rolls is obvious.

If desired where the berth is deep its sides may be made curved downward and inward on a curve whose axis is the line joining the middle points of racks I I.

By my arrangement of supporting and leveling devices there is avoided a very serious objection to self-leveling berths hung upon a pivot or pivots above and allowed to swing freely. Such berths, especially when occupied, gain such momentum during the rolling of a vessel in a storm that even a weighted pendulum or equivalent device is not enough to keep it from swinging to an undue and dangerous extent. The weighted pendulum used with such berths, if heavily weighted, is liable to attain too great momentum and swing too far, so as to tilt the berth one way or the other from its desired level position.

My controlling-racks prevent the attaining of any dangerous amount of momentum by either berth or pendulum, prevent the berth having any lateral movement independent of the roll of the vessel or tilting in excess of that just necessary to compensate for the inclination of the bulk-head, and cause the adjustment of the berth to take place more gradually and yet with sufficient rapidity, so that it will always remain level, no matter how much the vessel may roll.

To prevent the bed from partaking of the pitching motion of the vessel, I pivot the bed-bottom at its sides upon supports attached to the inner sides of the berth-frame. This pivotal support I prefer to make adjustable toward or away from the head of the bed-bottom, according to the length of the occupant. The bed can then be adjusted to balance properly upon its side supports with any occupant. To the inner sides of the berth-frame I fasten brackets L L opposite each other and having journal-openings $l$ $l$ to receive the journals $L'$ $L'$ on the upper and outer ends of the U-shaped frame $L^2$, extending across under the bed-bottom, sufficient space being left between the sides of the bed-bottom and the brackets for the ends of the frame and also the adjusting-levers, to be described. The upper ends of the frame $L^2$ are not on a level with the tops of the journal-studs $L'$ $L'$, but below the same, so as to form surfaces eccentric to said journal-studs. Resting upon each of these upper ends of the frame is a slightly-curved plate, M, upon which rests and to which is preferably attached the spring $M'$, having at its ends loops $m$ $m$, engaging pins or studs $m'$ $m'$ on the sides of the bed-bottom. These loops, which may be made by bending around the ends of the spring, as indicated in the drawings, or otherwise, are made not round, but elongated, so that the spring ends can have longitudinal play with reference to the pins. Attached to the top of spring $M'$ is a second spring, $M^2$, curving slightly upward toward each end from its middle portion, which rests upon spring $M'$, and at its ends bearing up against lugs or short bearing-plates $m^2$ $m^2$ on the berth-frame sides. With this construction the bed-bottom will be pivotally supported by the springs $M'$ $M'$, resting upon the upper ends of the frame $L^2$. The loops in the spring ends allow the supporting-spring to yield or bend with the weight of the occupant and to take up any shock or jar.

Pivoted on a stud, N, on one of the brackets L L is a lever, $N'$, the lower arm of which extends downward between the side of the bed-bottom and the upper end of frame $L^2$, and is provided at its lower end with a fork, $n$, which engages a stud, $n'$, on the frame. With this construction, as the lever is swung on its pivot the frame will be correspondingly swung on its pivots.

As the portions of the frame ends upon which the spring supporting or bearing plates M M rest are eccentric to the center of motion of the frame, the points of bearing of the plates upon the frame will, as shown best in Fig. 8, be shifted as the frame is swung on its journals toward one end or the other of the bed-frame.

The portions of the frame ends upon which the spring-plates bear are preferably curved, so that the change of the points of support will be gradual as the frame is swung and proportional to the amount of the swing of the frame. A tooth, $n^2$, on the lever serves to engage a curved rack, $n^3$, on the berth-frame, to hold the lever in any desired position.

For an occupant of any length, the points of support of the bed-bottom on both sides are shifted together by swinging the frame $L^2$ on its pivots, as described, until the bed-bottom will stand substantially horizontal while the occupant is in place on it, and then the lever is locked at such adjustment by engagement of its tooth $n^2$ with rack $n^3$. The spring $M^2$, bearing as it does at its ends against the bearing-pieces on the berth-frame, tends to keep the bed-bottom normally parallel with the bottom of the berth-frame, and acts to return it to such position when it has been from any cause rocked on its pivotal supports out of such position.

As the vessel pitches and the berth is rocked longitudinally to raise and lower its opposite ends alternately, the bed-bottom being balanced, as described, remains substantially horizontal, and does not partake of the pitching motion of the berth-frame and bulk-heads. As the berth-frame moves thus independently of the bed-bottom, the ends of springs $M^2$ yield alternately, resisting enough to prevent sudden and jarring contact of the stop-pins $n^4$ $n^4$ on the berth-frame with the bed-bottom.

On the weighted bar E is fastened a strap or split ring, O, which, by means of screw $o$, draws the ring ends together to clamp closely the bar within the ring. Upon the under side of this ring is a tooth, $O'$. If desired, this tooth could be formed on or otherwise attached to the bar.

In the bottom P of the berth-casing is a transverse slide-box, R, just below the path of the tooth $O'$ carried by the weight-bar. For clearness sake the pendulums and weight-bar will be described as swinging with reference to the bottom of the berth-casing, although such swinging is only apparent, not actual, as the weight-bar really remains substantially stationary, while the casing-bottom passes back and forth under it. Sliding in such box, and guided at its outer end in an opening in the box end, and at its inner end upon the bottom of the box, is a slide, $R'$. The inner end of this slide is turned up and engages the end of spiral spring $r$, which at its other end bears against a lug, $r'$, on the box. In the drawings I show a spiral spring surrounding a suitable guiding-rod, $r^2$; but any desired form of spring can of course be used. With this construction the spring tends to force the slide toward the end of slide-box, which is toward the front of the berth. Said box is, below the central portion of the path of the tooth $O'$, open at its top. In such opening $O^2$ are pivoted two weighted pawls or tumblers, S S, having their outer portions weighted, so that they tend always to fall down, so as to elevate the inner lighter ends of the pawls. The under sides of the weighted portions of the pawls are rounded, as shown.

The slide $R'$ is provided with two depressions, $s$ $s$, so situated that when the slide has been thrown inward by the spring, as described, they will be below the weighted ends of the pawls S S, so that said ends can drop down, as shown in Fig. 3. The ends of these depressions are rounded, so that when the slide is moved out against the stress of the spring these rounded ends will ride under and throw up the weighted pawl ends to bring the other pawl ends down flush with the top of the slide-box. The flat portions of the slide on either side of the depressions s s, when engaging the pawls, serve to keep them down flush with the box-top, as shown in Fig. 3. To operate this slide a strap, T, attached to the outer end thereof, passes around the pulley t and up at the rear side of the berth to and around the short shaft U, journaled in bearings u u on plate U', fastened to the side of the bulk-head. On one end of this shaft is a lever-arm, U².

The strap is so wound upon the shaft that when the latter is turned by throwing down the lever or crank arm thereon the strap is drawn so as to pull the slide out to swing the weighted pawls down, as described hereinbefore. Behind this shaft is a leaf-spring, U³, bearing against it, and said shaft is provided with flat portions which the spring engages when the shaft is turned up or down, so as to hold it as turned.

The operation of this locking device is as follows: When the shaft is turned so as to slacken the strap and allow the slide R' to be thrown over by its spring, the weighted ends of the pawls or tumblers drop down into the depressions in the slide. As the weight-bar E then swings over the pawls the tooth O' passes over the first pawl, presses down its inner and lighter end, and comes in contact with the end of the other pawl and is stopped. Meantime the end of the pawl just passed flies up behind the tooth O', and so the weight-bar is locked. The bar being thus locked, the pendulums and also the berth are held from movement with relation to the bulk-heads and berth-casing. The occupant can then get in or out with ease. When the occupant has got in, the lever-arm U² is pulled down to rotate the shaft U and pull up the strap. This throws the pawls down and holds them down, as described hereinbefore, releasing and leaving free the tooth on the weight-bar, to let the leveling devices go into and continue in action.

To conceal the pendulous yokes of the suspending and leveling mechanism, I provide the casings V V, attached to the bulk-heads and extending down a little way in front of the upper edges of the head and foot boards of the berth. The upper edges of these boards are curved, and the lower edges of the casings V V are similarly curved, so as to allow of the relative motions of the bulk-heads and berth as the vessel rolls. To the head-board I prefer to attach a hood, W, which, when down, as shown in Fig. 9, will extend over the head of the occupant of the berth and prevent his seeing the motions of the bulk-heads and the berth-casing and state-room. This hood, which is attached at its upper edge to the head-board, is spread upon a folding frame which is pivoted to ears or arms w w, fastened to the sides of the berth.

When the occupant desires to get out, the hood can be folded or thrown up against the head-board, to be dropped again, as desired.

Having thus described my invention, what I claim is—

1. In combination with the berth suspended from the bulk-heads and provided with automatic leveling devices, the intermeshing racks on the berth-frame and bulk-heads independent of the supports of the berth-frame, substantially as and for the purpose described.

2. In combination with the berth and the automatic leveling devices therefor, all suspended and supported from the bulk-heads, the intermeshing curved racks on the berth-frame and bulk-heads independent of the supports of the berth-frame, substantially as and for the purpose described.

3. In combination with a weighted yoke suspended on suitable bearings on the bulk-head, the berth-frame having its end suspended from said yoke, and suitable teeth or projections on the berth-frame engaging similar teeth or projections on the bulk-head, so as to prevent lateral movement of the berth end with reference to the bulk-head, while allowing the bulk-head to rock with relation to the berth, substantially as and for the purpose described.

4. In combination with the two weighted yokes suspended on suitable bearings on the bulk-heads, the berth suspended from said yokes, fixed teeth or projections on each end of the berth-frame, and corresponding teeth or projections meshing with them attached to the bulk-heads, substantially as and for the purpose described.

5. In combination with one end of the berth, a pendulous yoke pivotally supported upon the bulk-head and a weighted pendulum attached to it, links supporting the berth end from the arm of the yoke, and the meshing racks on the berth-frame and bulk-head, respectively, substantially as and for the purpose described.

6. In combination with the yoke pivotally supported upon the bulk-head and provided with a pendulum, the links dependent from the yoke-arms, the berth end pivotally attached to such links, the curved intermeshing racks on the berth-frame and the bulk-head, respectively, and suitable ribs or flanges attached to or formed on one of the racks and engaging the sides of the other rack, substantially as and for the purpose specified.

7. In a berth-leveling mechanism, the two pendulums swinging independently of the berth, rigidly connected together so as to move synchronously, substantially as and for the purpose described.

8. In combination with the two pendulums of the berth-leveling mechanism swinging independently of the berth-frame, a bar connecting the same, substantially as and for the purpose described.

9. In a berth-leveling mechanism, the two pendulums, in combination with the weight-bar independent of the berth-frame connecting the two pendulums, substantially as and for the purpose described.

10. In a berth-leveling mechanism, in combination with the two pendulums, the weight-bar connecting the same, separate from the berth-frame, and the wheels or rollers carried with the pendulums and engaging suitable ways on the bulk-heads, so as to hold the pendulums away from the bulk-heads while allowing them to swing freely, substantially as and for the purpose described.

11. In combination with the two pendulums hung upon suitable supports on the bulk-heads at the head and foot of the berth, the weight-bar connecting the pendulums and independent of the berth-frame, the rollers or wheels traveling with the pendulums, and suitable tracks or ways on the bulk-heads, substantially as and for the purpose described.

12. In a berth-leveling mechanism, in combination with the two pendulums swinging from suitable supports, the angle-pieces on the lower ends thereof, and the weight-bar resting and fastened at its opposite ends in suitable sockets on the angle-pieces, substantially as and for the purpose described.

13. In combination with the two pendulums, the weight-bar therefor, the angle-pieces on the lower ends of the pendulums provided with sockets for the ends of the weight-bar, means for fastening the bar ends firmly and rigidly in such sockets, and wheels or rollers journaled in the angle-pieces and adapted to run on suitable ways or tracks as the pendulums swing, substantially as and for the purpose described.

14. In combination with the pendulums of a berth-leveling mechanism, a locking device, substantially as described, for locking the pendulums and releasing them at will, substantially as and for the purpose described.

15. In combination with the two pendulums and the weight-bar connecting the same, a locking device, substantially as described, for engaging and holding a lug or projection on the bar at a point below the central line of the berth, substantially as and for the purpose described.

16. In combination with the bar connecting the two pendulums and the tooth or projection carried by the bar, the two pawls adapted to engage such projection on opposite sides, so as to lock the bar and hold it from swinging, substantially as and for the purpose described.

17. In combination with the weight-bar connecting the two pendulums, carrying on its under side a tooth or projection, the weighted pawls pivoted below the path of the projection as the bar swings with reference to the berth-bottom, having their outer ends weighted, so as to tend to keep their inner adjacent ends normally raised, and a slide provided with depressions into which the weighted ends can drop, substantially as and for the purpose described.

18. In a locking device for a self-leveling berth mechanism, in combination with the weighted pawls having their outer ends weighted and rounded on their under sides, a slide below the pawls having depressions into which the weighted pawl ends can drop, and the ends of the depressions made rounded or inclined, so that as the slide is moved they will ride under and swing up the pawl ends, substantially as and for the purpose described.

19. In combination with the pendulum weight-bar and the automatic lock therefor, the slide for causing the lock to release the bar, the strap connected with the slide, the shaft upon which the strap is wound, the spring adapted to bear against flattened portions of the shaft to hold it as turned in either direction, and a suitable crank-arm, substantially as and for the purpose described.

20. In combination with the pendulum weight-bar and the ring clamped thereon and carrying on its under side a tooth or projection, the weighted pawls or tumblers on the berth-bottom, the slide provided with the two depressions, the spring acting upon the slide, the slide-actuating strap, and means, substantially as described, whereby the occupant of the berth can pull the strap to actuate the slide, substantially as and for the purpose described.

21. In combination with the berth-frame and the bed-bottom, pivotal bearings between the sides of the bed-bottom, and the berth-frame made adjustable longitudinally of the bed-bottom toward or from either end thereof, substantially as and for the purpose described.

22. In combination with the bed-bottom, a bearing-plate on each side thereof attached thereto, the berth-frame, and supports on such frame for the bearing-plates, made adjustable with reference to such plates toward either end of the berth, substantially as and for the purpose specified.

23. In combination with the bed-bottom and berth-frame, the bearing-plates on each side of the bottom, the springs supported on the plates and at their ends suitably attached to the bed-bottom, the swinging frame supported from the berth-frame, and bearings on this frame for the bearing-plates eccentric to the axis of motion of the frame, substantially as and for the purpose described.

24. In combination with the bed-bottom, the springs at each side connected at their opposite ends with the bed-bottom by means of loops engaging pins, the bearing-plates on the under sides of the springs, the swinging frame extending across under the bed-bottom, and the bearings on the frame for the bearing-plates, made rounded and eccentric to the axis of motion of the frame, substantially as and for the purpose described.

25. In combination with the berth-frame and the swinging frame extending across the same, journaled in suitable bearings on the berth-frame sides, a lever provided with a fork adapted to engage a pin or stud on the frame, and means, substantially as described, for fixing the lever in any desired position, substantially as and for the purpose described.

26. In combination with the bed-bottom provided on each side with two pins, the springs M' M', having their ends provided with loops to engage the pins on the bed-bottom sides, the plates M M on the under sides of the springs, pivotal supports for these plates on the berth-frame, the springs $M^2 M^2$, attached to springs M' M', and suitable bearings on the berth-frame up against which bear the ends of springs $M^2 M^2$, substantially as and for the purpose described.

In testimony that I claim the foregoing I have hereunto set my hand this 16th day of February, A. D. 1886.

BENJAMIN F. MERRILL.

Witnesses:
ELMER P. HOWE,
F. G. WHISTON,